(12) United States Patent
Chan et al.

(10) Patent No.: US 10,105,593 B2
(45) Date of Patent: Oct. 23, 2018

(54) FILE PREFETCHING FOR GAMING APPLICATIONS ACCESSED BY ELECTRONIC DEVICES

(71) Applicant: Razer (Asia-Pacific) Pte. Ltd., Singapore (SG)

(72) Inventors: Michael A. Chan, San Francisco, CA (US); Michael K. Fleming, San Francisco, CA (US); Justin Quan, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 732 days.

(21) Appl. No.: 14/248,219

(22) Filed: Apr. 8, 2014

(65) Prior Publication Data

US 2015/0283462 A1 Oct. 8, 2015

(51) Int. Cl.
*G06F 15/16* (2006.01)
*A63F 13/30* (2014.01)
*H04L 29/08* (2006.01)
*H04L 29/06* (2006.01)
*A63F 13/355* (2014.01)
*A63F 13/79* (2014.01)

(52) U.S. Cl.
CPC ............ *A63F 13/12* (2013.01); *A63F 13/355* (2014.09); *A63F 13/79* (2014.09); *H04L 65/4007* (2013.01); *H04L 67/10* (2013.01); *H04L 67/1002* (2013.01); *H04L 67/2842* (2013.01); *H04L 67/2847* (2013.01); *H04L 67/306* (2013.01); *H04L 67/38* (2013.01); *A63F 2300/407* (2013.01)

(58) Field of Classification Search
CPC ..................................................... H04L 67/10
See application file for complete search history.

(56) References Cited

U.S. PATENT DOCUMENTS

| 5,925,100 | A | 7/1999 | Drewry et al. |
| 6,085,226 | A | 7/2000 | Horvitz |
| 6,286,080 | B1 | 9/2001 | Galbraith et al. |
| 6,385,641 | B1 | 5/2002 | Jiang et al. |
| 6,721,870 | B1 | 4/2004 | Yochai et al. |
| 6,757,696 | B2 | 6/2004 | Multer et al. |

(Continued)

FOREIGN PATENT DOCUMENTS

| CN | 101692239 A | 4/2010 |
| WO | 2013/137917 A1 | 9/2013 |

OTHER PUBLICATIONS

Non-Final Office Action dated Jun. 16, 2014, for U.S. Appl. No. 14/180,021 of Chan, M.A. et al., filed Feb. 13, 2014.

(Continued)

*Primary Examiner* — Moustafa M Meky
*Assistant Examiner* — Sm Z Islam
(74) *Attorney, Agent, or Firm* — Mattingly & Malur, PC

(57) ABSTRACT

Techniques introduced here enable cloud-based file prefetching for gaming applications running on electronic devices. The electronic devices store certain gaming data files on a remote storage server and preload some of the files locally to include file access efficiency. Gaming data file access patterns on the electronic devices are analyzed, individually and collectively, using a cloud service to detect global access patterns and help determine which gaming data files to preload on each of the electronic devices.

19 Claims, 12 Drawing Sheets

(56) References Cited

U.S. PATENT DOCUMENTS

| | | | |
|---|---|---|---|
| 6,877,065 B2 | 4/2005 | Galbraith et al. | |
| 6,918,113 B2 | 7/2005 | Patel et al. | |
| 6,959,320 B2 | 10/2005 | Shah et al. | |
| 7,043,524 B2 | 5/2006 | Shah et al. | |
| 7,062,567 B2 | 6/2006 | Benitez et al. | |
| 7,139,811 B2 | 11/2006 | Lev Ran et al. | |
| 7,155,465 B2 | 12/2006 | Lee et al. | |
| 7,222,186 B2 | 5/2007 | Kobayashi | |
| 7,260,672 B2 | 8/2007 | Garney | |
| 7,451,225 B1 | 11/2008 | Todd et al. | |
| 7,685,255 B2 | 3/2010 | Amlekar et al. | |
| 7,792,792 B2 | 9/2010 | Witriol et al. | |
| 7,805,531 B2 | 9/2010 | Groll et al. | |
| 8,019,811 B1 | 9/2011 | Britto et al. | |
| 8,136,089 B2 | 3/2012 | Snodgrass et al. | |
| 8,214,594 B1* | 7/2012 | Kneisley | G06F 17/30902 707/672 |
| 8,386,425 B1 | 2/2013 | Kadayam et al. | |
| 8,438,298 B2 | 5/2013 | Arai et al. | |
| 8,456,972 B2 | 6/2013 | Mehra et al. | |
| 8,539,163 B1 | 9/2013 | Sivasubramanian et al. | |
| 8,566,788 B2 | 10/2013 | Snodgrass et al. | |
| 8,732,406 B1 | 5/2014 | Pase et al. | |
| 8,756,620 B2 | 6/2014 | Papish et al. | |
| 8,769,210 B2 | 7/2014 | Bell, Jr. et al. | |
| 8,972,690 B2 | 3/2015 | Horn et al. | |
| 2002/0083183 A1 | 6/2002 | Pujare et al. | |
| 2002/0133537 A1 | 9/2002 | Lau et al. | |
| 2002/0184403 A1 | 12/2002 | Dahlin et al. | |
| 2003/0200282 A1 | 10/2003 | Arnold et al. | |
| 2005/0097268 A1* | 5/2005 | Vollmer | G06F 3/0613 711/113 |
| 2006/0277271 A1* | 12/2006 | Morse | H04L 67/306 709/217 |
| 2007/0067382 A1 | 3/2007 | Sun | |
| 2007/0078770 A1 | 4/2007 | Hsieh | |
| 2007/0173332 A1* | 7/2007 | Liu | A63F 13/12 463/42 |
| 2007/0195692 A1 | 8/2007 | Hagglund et al. | |
| 2007/0240065 A1 | 10/2007 | Alperin et al. | |
| 2007/0245110 A1 | 10/2007 | Shibayama et al. | |
| 2007/0288247 A1 | 12/2007 | Mackay | |
| 2008/0071988 A1 | 3/2008 | Schloter et al. | |
| 2008/0140997 A1 | 6/2008 | Tripathi | |
| 2008/0178298 A1 | 7/2008 | Arai et al. | |
| 2008/0183903 A1 | 7/2008 | VanStee et al. | |
| 2008/0250024 A1 | 10/2008 | Kvm et al. | |
| 2008/0293488 A1 | 11/2008 | Cheng et al. | |
| 2009/0287842 A1 | 11/2009 | Plamondon | |
| 2010/0088369 A1 | 4/2010 | Sebastian et al. | |
| 2010/0115211 A1 | 5/2010 | de la Iglesia et al. | |
| 2010/0138613 A1 | 6/2010 | Parker | |
| 2010/0306652 A1 | 12/2010 | Bolger et al. | |
| 2010/0325199 A1 | 12/2010 | Park et al. | |
| 2011/0213994 A1 | 9/2011 | Thereska et al. | |
| 2011/0320558 A1 | 12/2011 | Gross et al. | |
| 2012/0078727 A1 | 3/2012 | Lee | |
| 2012/0084151 A1 | 4/2012 | Kozak et al. | |
| 2012/0084348 A1 | 4/2012 | Lee et al. | |
| 2012/0084349 A1 | 4/2012 | Lee et al. | |
| 2012/0094594 A1* | 4/2012 | Rofougaran | G06F 1/1626 455/15 |
| 2012/0122552 A1* | 5/2012 | Youm | A63F 13/77 463/23 |
| 2012/0151255 A1 | 6/2012 | Lee et al. | |
| 2013/0031204 A1 | 1/2013 | Graham et al. | |
| 2013/0067168 A1 | 3/2013 | Havewala et al. | |
| 2013/0185258 A1 | 7/2013 | Bestler et al. | |
| 2013/0210527 A1 | 8/2013 | Kim et al. | |
| 2013/0318306 A1 | 11/2013 | Gonion | |
| 2013/0330497 A1 | 12/2013 | Villata | |
| 2013/0339407 A1 | 12/2013 | Sharpe et al. | |
| 2014/0006538 A1 | 1/2014 | Oikonomou | |
| 2014/0040346 A1 | 2/2014 | Yanagihara et al. | |
| 2014/0066176 A1* | 3/2014 | LeTourneau | A63F 13/60 463/23 |
| 2015/0186413 A1* | 7/2015 | Zhu | G06F 17/30241 707/751 |
| 2015/0207850 A1* | 7/2015 | Jitkoff | H04L 67/06 715/748 |
| 2015/0208205 A1 | 7/2015 | Chan et al. | |
| 2015/0365491 A1 | 12/2015 | Chan et al. | |

OTHER PUBLICATIONS

Non-Final Office Action dated Oct. 9, 2014, for U.S. Appl. No. 14/271,738 of Chan, M.A. et al., filed May 7, 2014.

Final Office Action dated Dec. 5, 2014, for U.S. Appl. No. 14/180,021 of Chan, M.A. et al., filed Feb. 13, 2014.

Co-Pending U.S. Appl. No. 14/042,452 of Chan, M.A. et al., filed Sep. 30, 2013.

Co-Pending U.S. Appl. No. 14/043,693 of Chan, M.A. et al., filed Oct. 1, 2013.

Co-Pending U.S. Appl. No. 14/043,082 of Chan, M.A. et al., filed Oct. 1, 2013.

Co-Pending U.S. Appl. No. 14/155,067 of Chan, M.A. et al.., filed Jan. 14, 2014.

Co-Pending U.S. Appl. No. 14/171,679 of Chan, M.A. et al., filed Feb. 3, 2014.

Co-Pending U.S. Appl. No. 14/180,021 of Chan, M.A. et al., filed Feb. 13, 2014.

Co-Pending U.S. Appl. No. 14/271,738 of Chan, M.A. et al., filed May 7, 2014.

International Search Report and Written Opinion dated Jan. 22, 2014, 10 pp., for International Application No. PCT/US2013/063003 filed Oct. 2, 2013.

Notice of Allowance dated Mar. 31, 2014, for U.S. Appl. No. 14/155,067 by Chan, M.A. et al., filed Jan. 14, 2014.

Non-Final Office Action dated Apr. 4, 2014, for U.S. Appl. No. 14/171,679 by Chan, M.A. et al., filed Feb. 3, 2014.

Notice of Allowance dated May 5, 2014, for U.S. Appl. No. 14/171,679 by Chan, M.A. et al., filed Feb. 3, 2014.

Final Office Action dated Apr. 20, 2015, for U.S. Appl. No. 14/271,738 by Chan, Ma, et al., filed May 7, 2014.

Non-Final Office Action dated Jul. 21, 2015, for U.S. Appl. No. 14/043,693 by Chan, M.A., et al., filed Oct. 1, 2013.

Non-Final Office Action dated Aug. 10, 2015, for U.S. Appl. No. 14/180,021 by Chan, M.A., et al., filed Feb. 13, 2014.

Non-Final Office Action dated Sep. 25, 2015, for U.S. Appl. No. 14/042,452 by Chan, M.A., et al., filed Sep. 30, 2013.

Non-Final Office Action dated Nov. 25, 2015, for U.S. Appl. No. 14/271,738 by Chan, M.A., et al., filed May 7, 2014.

Non-Final Office Action dated Mar. 9, 2016, for U.S. Appl. No. 14/180,021 by Chan, M.A., et al., filed Feb. 13, 2014.

Final Office Action dated Mar. 10, 2016, for U.S. Appl. No. 14/043,693 by Chan, M.A., et al., filed Oct. 1, 2013.

Final Office Action dated Jul. 18, 2016, for U.S. Appl. No. 14/042,452 by Chan, M.A., et al., filed Sep. 30, 2013.

* cited by examiner

| Name | Type | Size | Access Time | Duration | Device Location | Access Type | Concurrent applications |
|---|---|---|---|---|---|---|---|
| Thunderbird_level5_block1.exe | gaming | 32M | 08/11/13, 7:15pm | 24.1 min | 34N 40' 10.12" | write | Facebook |
| Thunderbird_level5_block2.exe | gaming | 36M | 08/11/13, 7:39pm | 3.9 min | 34N 40' 10.12" | write | Facebook |
| Sudoku.exe | gaming | 11M | 08/12/13, 6:35am | 35.40 min | 56W 22' 43.08" | write | Music streaming application |

*FIG. 4*

| Name | Type | Size | Access Type | Likelihood | Timeframe | Conditions |
|---|---|---|---|---|---|---|
| Thunderbird_level5.exe | gaming | 147M | write | 80% | 7:00 - 9:00 pm | none |
| Thunderbird_level6.exe | gaming | 179M | write | 30% | 7:30 - 9:00 pm | after accessing Thunderbird_level5.exe |
| Sudoku.exe | gaming | 11M | write | 90% | 6:00 - 7:00 pm | while music streaming application is running |

*FIG. 5A*

| Name | Type | Size | Likelihood |
|---|---|---|---|
| Thunderbird_level5 - block1 | gaming | 32M | 70% |
| Thunderbird_level5 - block2 | gaming | 36M | 80% |
| Thunderbird_level5 - block3 | gaming | 39M | 50% |
| Thunderbird_level5 - block4 | gaming | 40M | 30% |

*FIG. 5B*

FILE PREFETCHING FOR GAMING APPLICATIONS ACCESSED BY ELECTRONIC DEVICES

FIELD

At least some embodiments of the present technology pertains to cloud computing and file prefetching, and more particularly, to cloud-based file prefetching for gaming applications accessed by electronic devices.

BACKGROUND

Today, people perform a large number of activities using a variety of electronic devices. For example, people watch videos on their desktops or play games on their cell phones. It would be helpful to ensure that when one is ready to perform an activity using an electronic device, the digital content necessary for performing the activity is available on the electronic device.

SUMMARY

Techniques introduced here enable cloud-based file prefetching for gaming applications accessed by electronic devices. The electronic devices store certain gaming files on a remote storage server and preload some of the files locally to include file access efficiency. File access patterns on the electronic devices are analyzed collectively and efficiently using a cloud service to detect global access patterns and help determine which files to preload on each of the electronic devices.

Using the access patterns, the cloud service can instruct the electronic devices to preload the files that have high probability to be used by the devices in future. Such increased hit rates for the cache of the preloaded files improve the file access efficiency and reduce data access lag for the electronic devices.

In accordance with the techniques introduced here, therefore, a method performed by a processor on a server that is connected to a plurality of client devices over networks is provided. The method receives a usage profile from one of the client devices. The usage profile contains access statistics of files that have been accessed by the client device. The method further analyzes usage profiles received from more than one of the client devices collectively to generate a prefetching profile for the client device. The prefetching profile specifies files that are likely to be accessed in the future by the client device. Then the method sends the prefetching profile to the client device.

In accordance with the techniques introduced here, therefore, another method for cloud-based file prefetching is also provided. The method sends a usage profile to the server. The usage profile contains access statistics of files that have been accessed by the client device. The method then receives a prefetching profile from the server. The prefetching profile specifies files that are likely to be accessed by the client device in the future based on a collective analysis of usage profiles sent by more than one of the client devices.

In accordance with the techniques introduced here, therefore, a method performed by a processor on a server that is connected to at least one client device over a network is also provided. The method receives usage profiles from a client device. Each of the usage profiles contains access statistics of files that have been accessed by one of multiple computer applications executed at the client device. The method then analyzes the usage profiles collectively to generate a prefetching profile for the client device. The prefetching profile specifies files that are likely to be accessed in the future by the client device. The method sends the prefetching profile to the client device so that the client device can prefetching files from a storage server based on the prefetching profile.

Alternatively, the server monitors the client device for specifics. e.g. storage size, storage usage, file access patterns, etc. Based on the monitored specifics, the server can provide a strong indication to the client device instructing the client device to cache a particular set of files. The server can also send to the client device a caching priority set (e.g. as a file or a message). The caching priority set includes cache scores assigned by the server for each file of the client device. The client device can choose to prioritize prefetching the files based on the cache scores. The caching priority set can be unique per client device, per device class (e.g., a class of mobile phones, a class tablet computers, etc), or per user account.

In accordance with the techniques introduced here, therefore, a client device connected to a server is also provided. The client includes a sending unit and a receiving unit. The sending unit sends a usage profile to the server. The usage profile contains access statistics of files that have been accessed by the client device. The receiving unit receives a prefetching profile from the server, wherein the prefetching profile specifies files that are likely to be accessed by the client device in the future based on a collective analysis of usage profiles sent by more than one of client devices connected to the server.

Other aspects of the technology introduced here will be apparent from the accompanying figures and from the detailed description which follows.

BRIEF DESCRIPTION OF THE DRAWINGS

These and other objects, features and characteristics of the present technology will become more apparent to those skilled in the art from a study of the following detailed description in conjunction with the appended claims and drawings, all of which form a part of this specification. In the drawings:

FIG. 4 contains a diagram illustrating an example usage profile maintained by a local profile manager.

FIGS. 5A and 5B illustrate an example prefetching profile received by a local profile manager.

DETAILED DESCRIPTION

Figure 1:
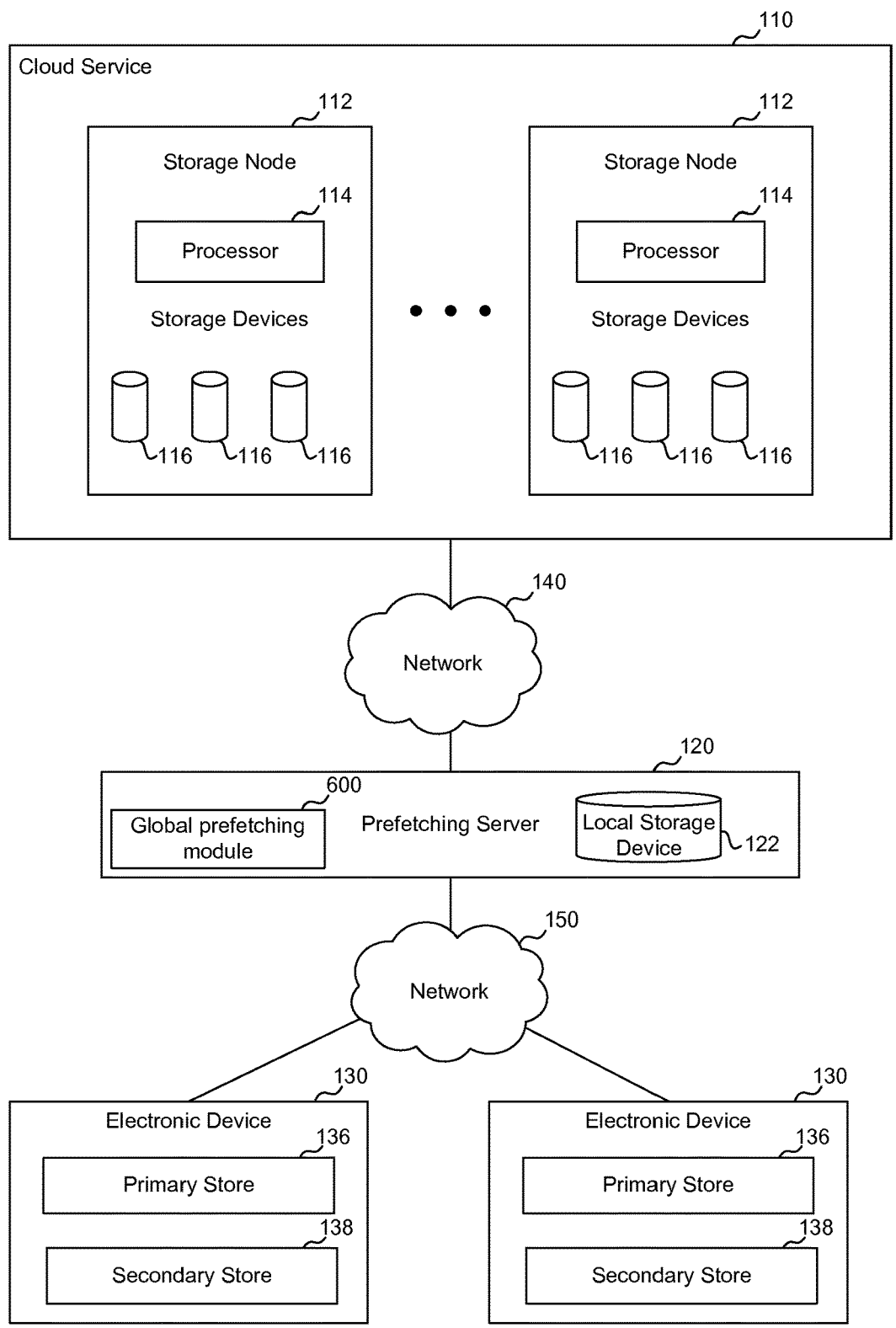
FIG. 1 contains a diagram illustrating an example environment in which cloud-based file prefetching on electronic devices can be carried out.

FIG. 1 contains a diagram illustrating an example environment in which cloud-based file prefetching on electronic devices can be carried out. In some embodiments, a cloud service 110 comprises a cluster having nodes 112 interconnected with each other by a network. Each of the nodes 112 contains one or more processors 114 and storage devices 116. The storage devices 116 can include optical disk storage, RAM, ROM, EEPROM, flash memory, phase change memory, magnetic cassettes, magnetic tapes, magnetic disk storage or any other computer storage medium which can be used to store the desired information.

In some embodiments, the cloud service 110 can store computer applications and application data used by electronic devices 130. The computer applications can include applications for general productivity and information retrieval, such as email, calendar, and applications in other categories, such as video games, mobile games, GPS services, banking, and any other categories as contemplated by a person having ordinary skill in the art. The cloud service 110 can also store usage profiles and store prefetching profiles. Each usage profile characterizes activities performed by a user using one of the electronic devices 130 and the required files for each of the activities. Each prefetching profile specifies files to be prefetched on the electronic device in anticipation of the user performing activities which require the files. The cloud service 110 can be responsible for making sure that the metadata and the actual content data of the files are persistent in the client-server distributed storage system.

An electronic device 130 can be a desktop computer, a laptop computer, a tablet computer, an automobile computer, a game console, a smart phone, a personal digital assistant, or any other device capable of running computer applications. In some embodiments, the electronic device 130 includes one primary store 136 to store computer applications, the installation of which is typical or requested by the user, application data created or requested by the user, user data, usage profiles, prefetching profiles, meta-data, and so on. The electronic device 130 also includes a secondary store 138 to store additional computer applications and application data that are not yet available in the primary store 136 but are expected to be requested by the user in the near future. The primary and secondary stores can similarly be any computer storage medium which can be used to store desired information.

A prefetching server 120 can be any standalone apparatus or system which has sufficient network bandwidth, data capacity, computational resources, and so on. In some embodiments, a prefetching server 120 can include a local storage device 122 to store analytical algorithms to be applied to usage profiles. The local storage device 122 can similarly be any computer storage medium which can be used to store desired information. In an alternative embodiment, the prefetching server 120 does not include a local storage device. The metadata of the files can be stored in memory components of the prefetching server 120 or electronic devices 130. Each of the networks 140, 150 may be a cellular network, a telephonic network, an open network, such as the Internet, a private network, such as an intranet and/or the extranet, or any other network known to a person having ordinary skill in the art.

Figure 2:
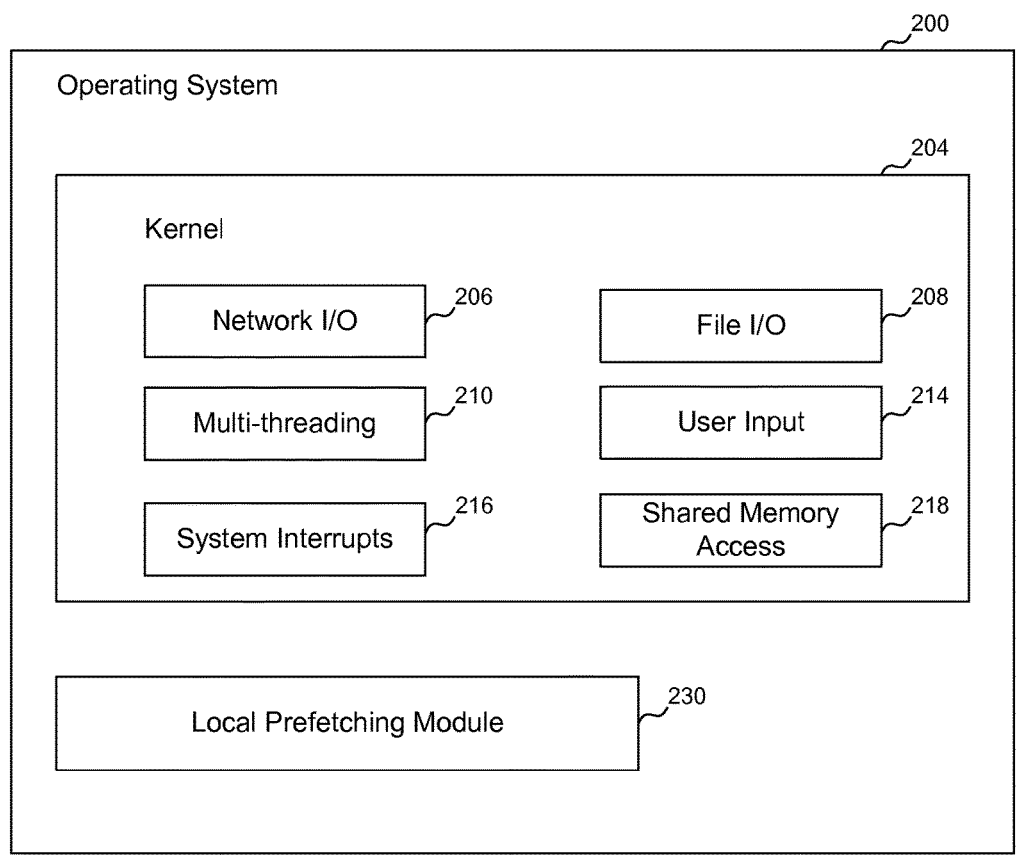
FIG. 2 contains a diagram illustrating an example operating system of an electronic device.

Each of the electronic devices 130 hosts an operating system which includes a local prefetching module 230. FIG. 2 shows a diagram illustrating an example operating system 200. In some embodiments, the operating system 200 includes a kernel 204. The kernel 204 controls the computer applications running on top of the kernel 204 and provides an interface to the hardware of the electronic device, thereby isolating the computer applications from the hardware. The kernel 204 may also include one or more intervening sources that can affect the execution of a computer application. For example, the kernel 204 may include a network I/O module 206, a file I/O module 208, a multi-threading module 210, a user input module 214, a system interrupts module 216, and a shared memory access module 218. Additional or fewer components can be included in the local kernel 204 and each illustrated component.

In some embodiments, the local prefetching module 230 also runs on top of the kernel 204. As one example, the local prefetching module 230 can run in a user space file system (e.g. FUSE) on top of a Linux kernel. As another example, the local prefetching module 230 runs in a kernel file system. Alternatively, the local prefetching module 230 can be implemented as part of a customized kernel 204.

Figure 3:
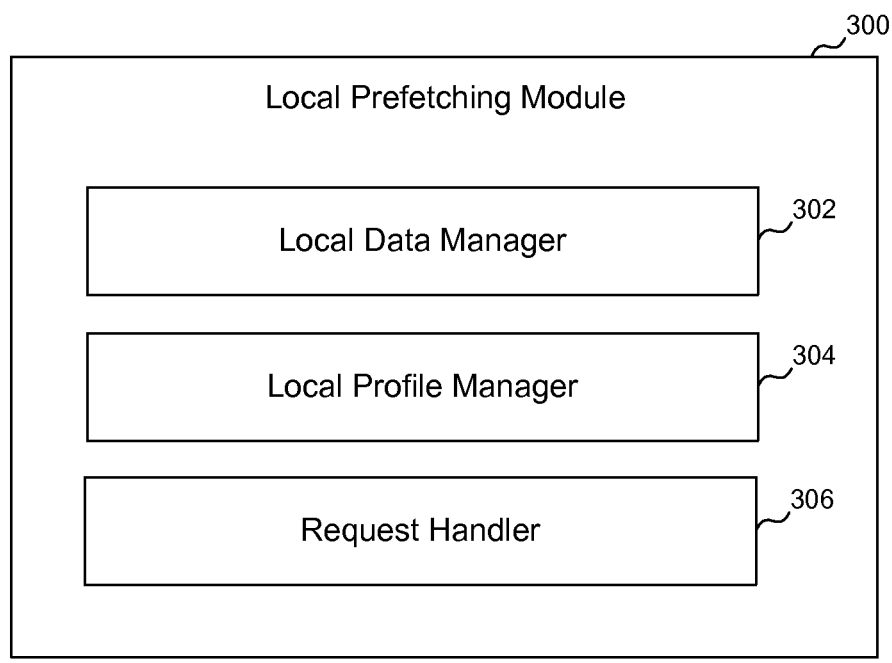
FIG. 3 contains a block diagram illustrating example components of a local prefetching module.

FIG. 3 contains a block diagram illustrating example components of a local prefetching module 300 for an electronic device. In some embodiments, the local prefetching module 300 includes a local data manager 302, a local profile manager 304 and a request handler 306. Additional or fewer components can be included in the local prefetching module 300 and each illustrated component.

In some embodiments, the local profile manager 304 tracks user activity on an electronic device and maintains one or more usage profiles in the primary store and sends them to the prefetching server. The local profile manager 304 can send the usage profiles periodically, as soon as there is an update, in response to a request from the prefetching server, and so on.

FIG. 4 contains a diagram illustrating an example usage profile. A usage profile can contain any information about the activities performed on the electronic device and files used in conjunction with the activities. In some embodiments, the usage profile contains information on access to the files stored in the primary store. The information can include, for example, the name of a file, the type of the file (partial computer application, full computer application, application data, gaming application, etc.), the size of the file, the time of access to the file, the duration of access of the file, the type of access (read, write, etc.), the location of the electronic device at the time of access, the identification of an application or process that accessed the file, and, applications running concurrently on the electronic device. In the example of FIG. 4, for the game Thunderbird, the user accessed the game data file in block 1 of level 5 at 7:19 pm for 24.1 minutes and the game data file in block 2 of level 5 at 7:30 pm for 3.9 minutes. Because the user's access data includes duration of time spent on specific game data files for each level of a game, it is possible to deduce a skill level of the user.

In some embodiments, the local profile manager 304 also receives prefetching profiles from the prefetching server and stores them in the primary store. The local profile manager 304 can also send requests to the prefetching server for the prefetching profiles periodically, when it has extra bandwidth available, and so on.

FIGS. 5A and 5B illustrate an example prefetching profile. A prefetching profile specifies files to be preloaded on an electronic device in anticipation of the user performing activities which require the files. For each of the specified files, information such as the name, the type, the size, the access type, the likelihood that the file is to be accessed, the timeframe within which the likelihood determination applies, conditions under which the likelihood determination applies can be included. The portion of the prefetching profile shown in the example of FIG. 5A shows gaming application data files and the likelihood that a particular file is likely to be accessed during a specified timeframe and the conditions under which the likelihood applies. For example, in the first line of the table in the example of FIG. 5A, the gaming application data file, Thunderbird_level5.exe, has an 80% likelihood of being accessed between 7:00 pm and 9:00 pm, and there are no other external conditions for which this likelihood applies. In the second line of the table, the gaming application data file, Thunderbird_level15.exe, has a 30% likelihood of being accessed between 7:30 pm and 9:00 pm, provided that an external condition has been met, that is, Thunderbird_level5.exe has been accessed. Thus, the gaming application data files in the prefetching profile shown in the table of FIG. 5A have a likelihood of being accessed that is determined based on a user's usage patterns and have a timeframe and conditions associated with the likelihood of being accessed.

FIG. 5B shows the likelihood of certain data files being accessed, where the likelihood of access is not just based on a user's usage patterns but is also based upon collective access to these files by other users of electronic devices. For example, the likelihood of access of these files can be based on how far the user progressed in the game when the user stopped playing the game and how long the user spent on each level or sublevel as compared to other users of the game. Thus, the gaming application data files in the prefetching profile shown in the table of FIG. 5B do not include a specific timeframe for the corresponding likelihood of access, rather the likelihood of access for each data file is applicable at any time of day.

In some embodiments, the local prefetching module 300 can take file access rights into account when the local prefetching module 300 determines the files to be prefetched. For instance, a subset of files in one device can only be accessible by one application running on the device. The local prefetching module 300 can determine whether to prefetch any file from that subset based on the status of the application (e.g., stopped, running, sleeping, idling, etc.). There can also be file access rights based upon the access status of other files. For instance, file B is only accessible after file A has been accessed; another file C is only accessible after file B has been accessed. The local prefetching module 300 can determine that there is no need to prefetch file C if file B has not been accessed, and that there is no need to prefetch files B and C if file A has not been accessed.

In some embodiments, the local data manager 302 sends requests to the cloud service 110 via the prefetching server 120 to retrieve specific computer applications or application data. The local data manager 302 can also send requests directly to whichever separate servers are hosting the computer applications or application data. In addition, the local data manager 302 receives the requested computer applications or application data and stores them in the primary store or the secondary store on the electronic device. The urgency with which the requests are sent and the requested computer applications and application data are stored is linked to where the requested computer applications or application data are to be stored. For example, in general, computer applications and application data are stored in the primary store on the electronic device when they are to be accessed immediately, and the sending and storing should be performed without delay, while computer applications and application data are stored in the secondary store when they are likely to be accessed in the near future, and the sending and storing can be performed with some flexibility in timing.

In some embodiments, based upon a given prefetching profile, the local data manager 302 determines which requests for file retrieval to send and in what order. The local data manager 302 can assess periodically, continuously, randomly, at predetermined intervals, or at any other time the prefetching profile to determine whether any gaming application data files should be prefetched. The local data manager 302 may first filter the prefetching profile to skip retrieving any file that is already present in the primary store. In some instances, the local data manager 302 may determine whether the conditions under which a data file should be prefetched applies, and then prefetching the appropriate data files. In some instances, the local data manager 302 may request all the files specified in the prefetching profile when the number of such files is small. In some instances, the local data manager 302 may initially request files identified in the prefetching profile having the highest likelihoods of being requested by the user or having the shortest expected time for being requested. When the size of the secondary store is limited, the local data manager 302 can enforce overwrite policies, such as by using cache algorithms known to someone of ordinary skill in the art.

In some embodiments, the request handler 306 accepts user requests for certain files and ultimately serves those files from the primary store. In general, the request handler 306 may first search the primary store, which has pre-installed or previously installed files. If the requested file is not there, the request handler 306 searches in the secondary store, which has prefetched files. The request handler 306 saves the requested file in the primary store before serving the file in response to user requests.

Figure 6:
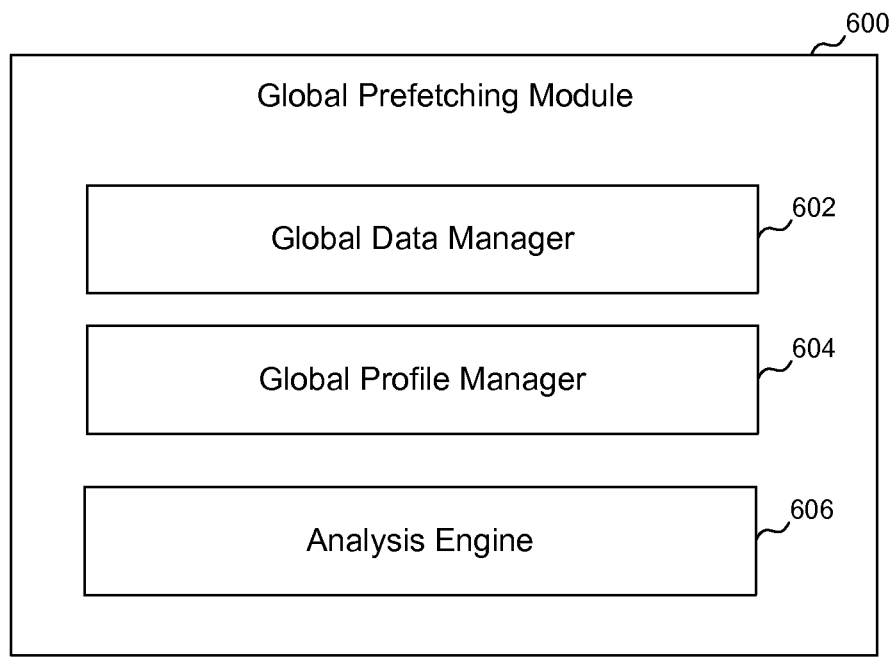
FIG. 6 contains a block diagram illustrating example components of a global prefetching module hosted by a prefetching server.

The prefetching server 120 hosts a global prefetching module 600. FIG. 6 shows a block diagram illustrating example components of the global prefetching module 600. In some embodiments, the global prefetching module 600 includes a global data manager 602, a global profile manager 604 and an analysis engine 606. Additional or fewer components can be included in the global prefetching module 600 and each illustrated component. In some embodiments, the functions performed by components of the prefetching server 120 can be performed by the cloud service 110, and the electronic devices 130 communicate directly with similar components in the prefetching server that are hosted by the cloud service 110.

In some embodiments, the global data manager 602 receives requests for computer applications or application data from the electronic devices and forwards them to the cloud service 110 or other sources. The global data manager 602 also receives the requested computer applications or application data from the cloud service 110 or other sources and forwards them to the electronic devices. The urgency with which the requests and the requested computer applications or application data are forwarded can similarly depend on where the requested computer applications or application data are to be stored, as discussed above.

In some embodiments, the global profile manager 604 receives usage profiles from the electronic devices and forwards them to the cloud service for storage. The global profile manager 604 can forward a usage profile to the cloud service immediately upon receiving it from an electronic device. The global profile manager 604 can also forward the usage profiles received from an electronic device according to a preset schedule. In addition, the global profile manager 604 can forward the usage profiles received from multiple electronic devices in batches of a predetermined size or periodically. The global profile manager 604 also maintains a global index of usage profiles in the local storage device 122 indicating how to access the usage profiles stored with the cloud service 110.

In some embodiments, the global profile manager 604 also receives prefetching profiles from the cloud service 110 and forwards them to the electronic devices 130. Similarly, the global profile manager 604 can forward a prefetching profile to the appropriate electronic device immediately or in response to a request from the electronic device for a prefetching profile. The global profile manager 604 can also wait to forward the prefetching profile together with a response to the next request from the electronic device, such as a request to retrieve certain computer application or application data. In addition, the global profile manager 604 can forward the prefetching profiles to one or more electronic devices according to a predetermined schedule.

In some embodiments, the analysis engine 606 manages analytical algorithms that take usage profiles as input and provide prefetching profiles as output. The analytical algorithms can be stored in the local storage device 122. Many types of analysis can be performed by the analytical algorithms on the usage profiles, individually and collectively, to detect usage patterns. According to various embodiments, the usage profiles may indicate that on an electronic device, a computer application or a part thereof is often executed or a piece of application data is often used on a certain day or at a certain time, when the computer application or the piece of application data has a certain size, immediately before or after another computer application or piece of application data, concurrently with one or more other computer applications, when the electronic device is at a certain location, when another electronic device is connected to the prefetching server, etc. The lack of execution or use can also be incorporated into the usage patterns.

Some example usage patterns are described as follows. Different levels of a game may often be accessed in an increasing order. The last few very difficult levels may never be accessed, and the levels before the currently accessed levels may also never be accessed again. The photos or soundtracks in an album may often be accessed in the listed order. More recent albums may be accessed more frequently. Larger files may often be accessed on devices with better resources. Business-related files may often be accessed during the day or on an electronic device in the office, while files pertaining to entertainment may often be accessed at night or on an electronic device at home. Best-selling books in a city may be frequently accessed in that city and surrounding cities. Therefore, different files can be associated with different access patterns (as referred to as access statistics), which can be learned from the usage profiles without knowing the nature of the files.

In some embodiments, each analytical algorithm takes into consideration one or more of the usage patterns and selects a set of files for an electronic device that are likely to be accessed in the near future on the electronic device. An analytical algorithm can assign different weights to different usage patterns. For example, the analytical algorithm usage patterns reflecting more recent activities across electronic devices can be given more weight. The analytical algorithm can also give more weight to usage patterns specific to the electronic device and/or those electronic devices owned by users similar to the owner of the electronic device. Furthermore, the analytical algorithm can apply any classification, pattern-recognition and other techniques known to someone of ordinary skill in the art.

In some embodiments, the analysis engine 606 chooses one or more of the analytical algorithms, based on predetermined rules, user input, etc., and submits a request to the cloud service 110 for executing the chosen analytical algorithm(s). In response, the cloud service 110 executes the chosen analytic algorithm(s) on the stored usage profiles in a distributed manner and generates resulting prefetching profiles for the electronic devices. The analysis engine 606 can submit a request as soon as a predetermined number of updated usage profiles are stored with the cloud service, according to a preset schedule, when the rate of file retrieval is high indicating a low degree of prefetching success, and so on. In some embodiments, the analysis engine 606 can execute one or more of the analytical algorithms that do not use data provided by other electronic devices to generate prefetching profiles.

Figure 7:
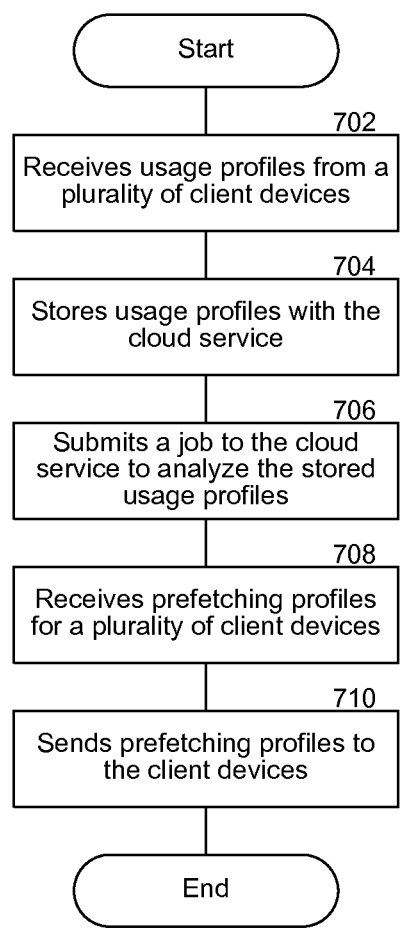
FIG. 7 contains a flowchart illustrating an example operation of a global profile manager of the global prefetching module.

FIG. 7 contains a flowchart illustrating an example operation of a global profile manager. In some embodiments, the global profile manager receives usage profiles from the electronic devices at step 702. The global profile manager forwards the usage profiles to the cloud service for storage at step 704. Subsequently, the global profile manager submits a request to execute one or more analytical algorithms maintained on the forwarded usage profiles at step 706. After the execution is complete, the global profile manager receives prefetching profiles for the electronic devices at step 708. Finally, the global profile manager forwards each of the prefetching profiles to the appropriate electronic device at step 710.

Figure 8:
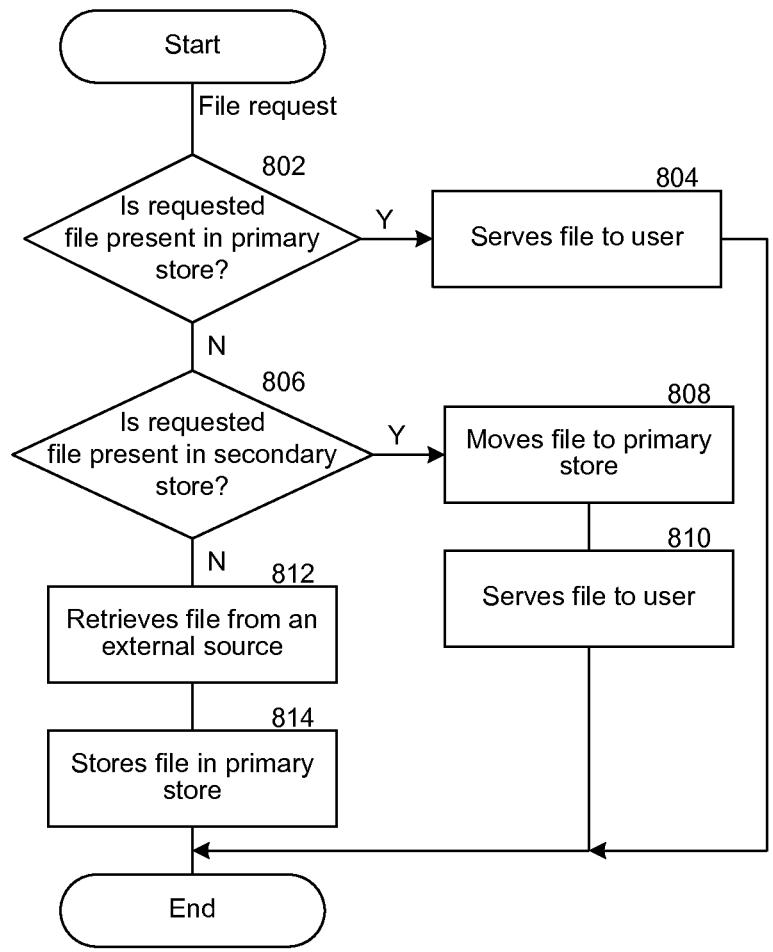
FIG. 8 contains a flowchart illustrating an example operation of the local prefetching module.

FIG. 8 contains a flowchart illustrating an example operation of a local prefetching module. In some embodiments, the request handler accepts a user request and determines whether a requested file is present in the primary store at step 802. If the file is present, the request handler serves the file at step 804. If the file is not present, the request handler determines whether the file is present in the secondary store at step 806. If the file is present, the request handler moves the file to the primary store at step 808 and serves the file at step 810. If the file is not present, the local data manager retrieves the file from a source at step 712 and stores the retrieved file in the primary store at step 714.

Figure 9A:
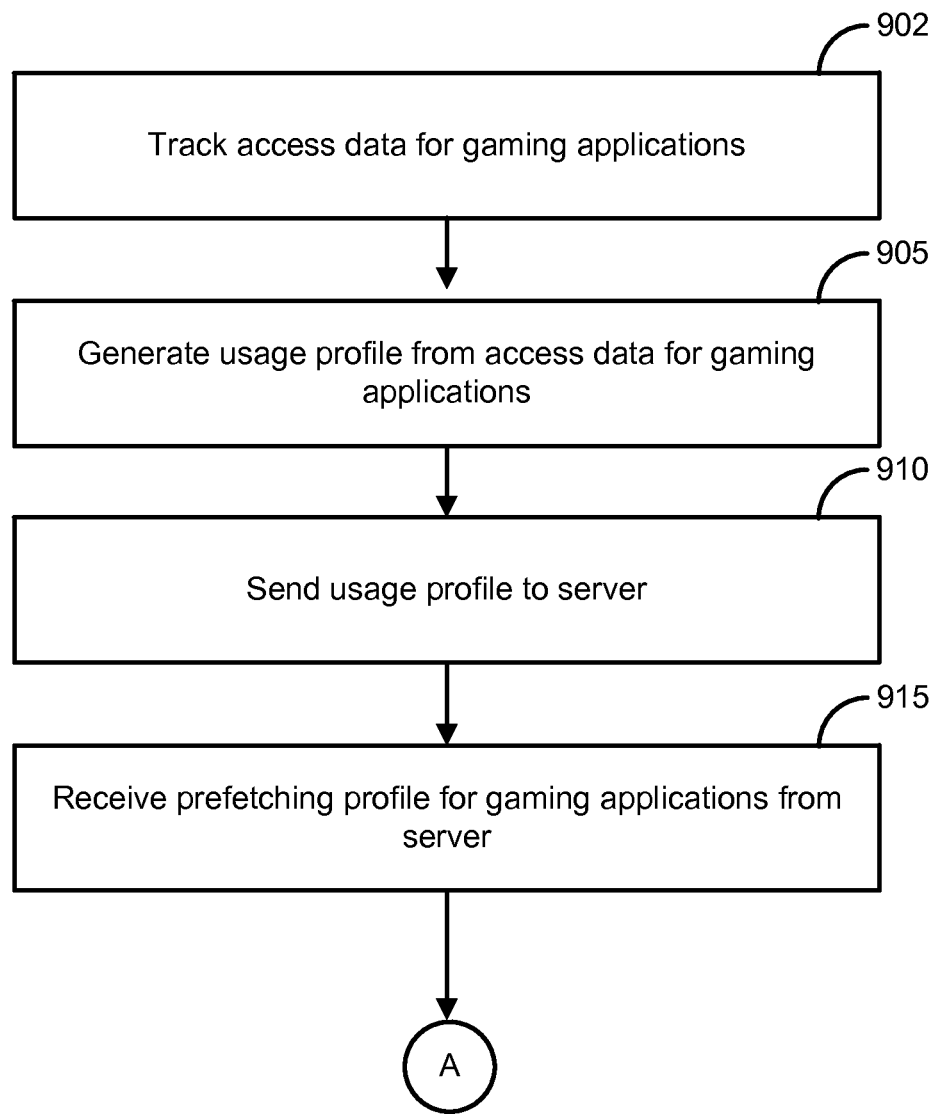
FIGS. 9A and 9B show a flow chart illustrating an example method for providing access data for gaming applications accessed by an electronic device and prefetching gaming application files identified in a prefetching profile.
Figure 9B:
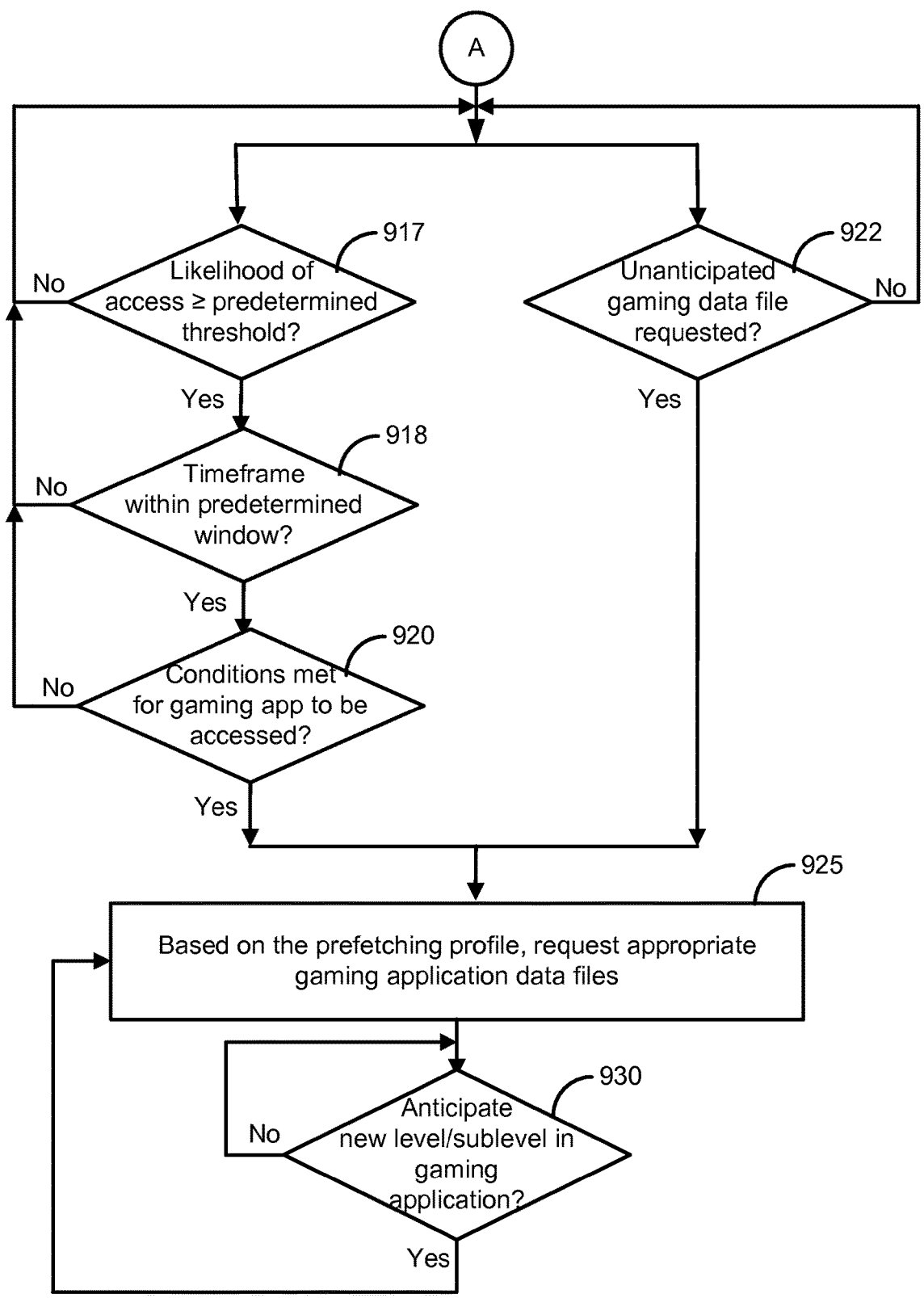

FIGS. 9A and 9B show a flow chart illustrating an example method for providing access data for gaming applications accessed by an electronic device and prefetching gaming applications and gaming application data files identified in a prefetching profile. The method shown in FIGS. 9A and 9B is performed by the local prefetching module of the electronic device.

At block 902, the local prefetching module tracks access data for gaming applications accessed by the user of the client device. Access data can include one or more levels of gaming applications that have been accessed by the client device and/or sublevels corresponding to specific blocks of data of the gaming application; a start or access time for which each of the accessed levels and/or sublevels of the gaming applications has been accessed; a duration spent on each of the accessed levels and/or sublevels; a location where each gaming application or level or sublevel is initially accessed; other applications running concurrently on the client device when gaming applications are accessed; and relevant information such as when the other applications were started.

Next, at block 905, the local prefetching module generates a usage profile from the tracked access data for the gaming applications. Then at block 910, the client device transmits the usage profile with the tracked access data for the gaming applications to a server. The server individually analyzes the usage profile from the client device and/or collectively analyzes the usage profile from the client device along with access data for gaming applications accessed by other client devices found in corresponding usage profiles. Alternatively, the server can forward the usage profile to a service that performs the analysis along with specified analytical algorithms to use in the analysis.

At block 915, the local prefetching module receives a prefetching profile for gaming applications from the server, where the prefetching profile includes a likelihood that specific gaming data files used by gaming applications will be accessed within a certain timeframe on the client device and the conditions that apply. In some embodiments, the likelihood is whether a specific gaming application will be accessed. For example, based on previous access data, a specific gaming application may be run with 90% likelihood on the client device when another application, such as a music streaming application is accessed and/or during a specific time period.

In some embodiments, the likelihood that specific gaming data files will be accessed is based on the likelihood that the user of the client device will progress beyond the last previously tracked level or sublevel of the gaming application. For example, if the collective analysis of multiple client devices shows that an average user typically takes 34 minutes to complete a specific level or sublevel of a gaming application, the prefetching profile will recommend prefetching the gaming data files needed for the next level or sublevel when the duration of access of the specific level has nearly elapsed. The collective analysis can also take into account how long the user of the client device spent on previous levels or sublevels of the gaming application to gauge the expertise of the user and modify the time that it predicts the user will spend on a specific level of the gaming application. For example, the time can be increased or decreased proportionately if the user spends longer or less time, respectively, on each level or sublevel than the average player of previous levels of the gaming application or the average player of similar types of gaming applications.

In some embodiments, if another program that may be work-related, for example, a word processing program, is accessed concurrently with the gaming application, the likelihood may be lower that the user of the client device will progress as rapidly through a level of the gaming application.

In some embodiments, the time of day that the gaming application is accessed is indicative of the likelihood that certain gaming data files will be requested. For example, if the gaming application is accessed during standard work hours on a weekday, the user may be playing the game during a temporary break from work or meetings, or in a waiting room at a doctor's appointment, thus the duration of access may be lower. However, if the gaming application is accessed on a weekend or in the evening on a weekday, it may be more likely that the user will spend a longer period of time playing and, thus, will progress through more levels and request access to gaming data files for more levels of the gaming application. Similarly, if a user plays a specific gaming application every day at the same time for a fixed or nearly fixed period of time, then there is a high likelihood, e.g., greater than 90%, that the gaming data files needed for the current level of the gaming application will be requested.

After block 915, the process can splits into two parallel paths at point A, as shown in the example of FIG. 9B. With the first path, the usage patterns of the user can be taken into account. At decision block 917, the local prefetching module determines whether the likelihood of accessing a gaming application is greater than a predetermined threshold. If the likelihood of accessing a gaming application is less than the predetermined threshold (block 917—No), the process 917 returns to point A.

If the likelihood of accessing a gaming application is greater than or equal to the predetermined threshold (block 917—Yes), at decision block 918, the local prefetching module determines whether the timeframe that the user is likely to access the gaming application is within a predetermined time window. For example, consider the case where the likelihood that the client device will access gaming application A is high, the timeframe that the client device is expected to access gaming application A is in the evening between 7:00 pm and 9:00 pm, and the current time is 6:40 pm. If the prefetching window is pre-set to be 10 minutes before the start of a timeframe, then gaming application A will not be prefetched yet at 6:40. However, if the prefetching window is pre-set to be 30 minutes before the start of a timeframe, then gaming application A will be prefetched. Thus, if the timeframe is not within the predetermined window (block 918—No), the process returns to point A.

If the timeframe is within the predetermined window (block 918—Yes), the process continues to decision block 920. At decision block 920, the local prefetching module determines whether conditions have been met for the gaming application to be accessed, as specified in the prefetching profile. For example, if the gaming application has been accessed by the client device around the same time every evening, the likelihood is high that the gaming application will be accessed around the same time on subsequent evenings. If conditions have not been met for the gaming application to be accessed (block 920—No), the process returns to decision point A. If conditions have been met for the gaming application to be accessed (block 920—Yes), the process continues to block 925.

With the second path after point A, the user's prior history with a gaming application and the user's skill level, as compared to others who have played the game, can be taken in to account. At decision block 922, the local prefetching module determines whether an unanticipated gaming application data file has been requested by the user. An unanticipated gaming data file is a gaming application data file that was not predicted to be accessed with any likelihood in the prefetching profile, a gaming application data file that was predicted to be accessed but with a likelihood of access lower than the predetermined threshold so that the corresponding gaming data file was not prefetched, or a gaming application data file that was scheduled to be prefetched but was not prefetched prior to a user request because the likelihood of being accessed was lower than other gaming data files that were prefetched instead. If an unanticipated gaming application data file has not been requested (block 922—No), the process returns to point A. If an unanticipated gaming application data file has been requested (block 922—Yes), the process continues to block 925.

At block 925, the client device requests appropriate data files for the gaming application based on the prefetching profile. Whether the process reached block 925 via the first path (decision blocks 917, 918, 920), or via the second path (decision block 922), the process uses the portion of the prefetching profile shown in the example of FIG. 5B. For this example, level 5 of the Thunderbird gaming application has four blocks of data files (also referred to as sublevels), block 1, block 2, block 3, and block 4. Once the user accesses level 5 of the gaming application, the likelihood that the user will access any of the blocks or sublevels is provided in the table shown in the example of FIG. 5B. Here, the likelihood of the user accessing block 2 is highest because, as shown in the example of FIG. 4, the user only spent 3.9 minutes on block 2 the last time the user accessed level 5 of the gaming application, which probably was not long enough to finish that sublevel. However, the user may also choose to start level 5 from the beginning. In one scenario, the user may have not finished block 1 of level 5 and simply skipped forward to block 2 of level 5. Thus, the likelihood that the user will access block 1 is also fairly high. The likelihood assigned to the various blocks of level 5 may take into account the user's previous gaming history with this game and other games as well as the average amount of time it takes other users playing the same game to finish a particular level and/or sublevel of the game. Then using the likelihood values given in the prefetching profile that the user will access any of the sublevels of blocks of level 5, the client device can prefetch the data files in order, from highest likelihood of access to lowest likelihood of access.

Then at decision block 930, the local prefetching module determines whether a new level will be accessed in the gaming application. If no new level is predicted to be accessed (block 930—No), the process remains at decision block 930. If a new level is predicted to be accessed, for example, because the length of time on which the current level of the gaming application is nearly equal to the average time spent by a player of comparable skill, the process returns to block 925 to prefetch gaming data files for the next level of the gaming application.

Figure 10:
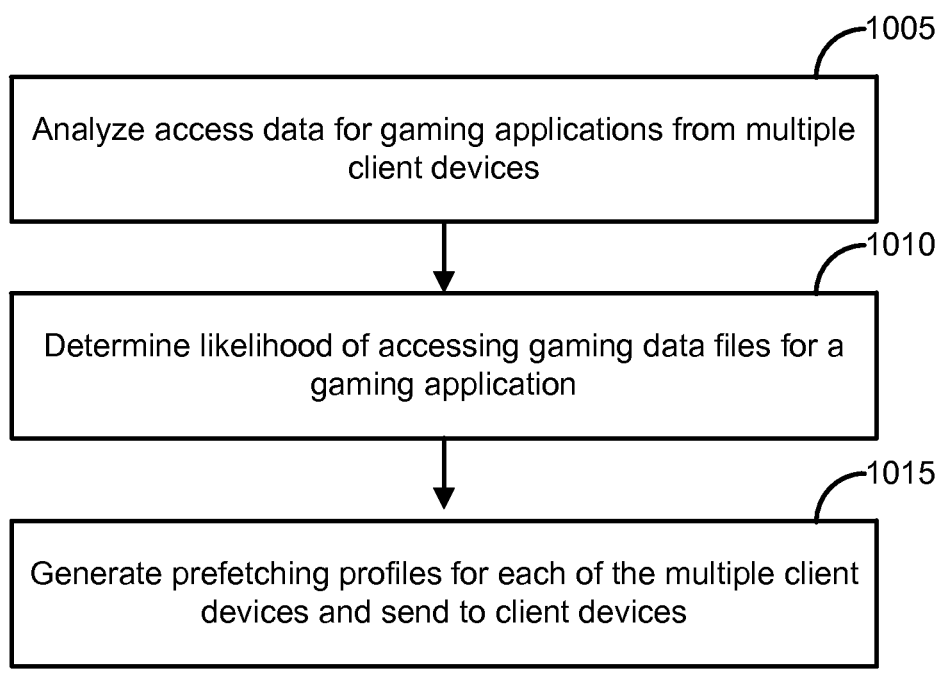
FIG. 10 is a flow chart illustrating an example method for analyzing access data for gaming applications from multiple client devices.

FIG. 10 is a flow chart illustrating an example method for analyzing access statistics for gaming applications from multiple client devices.

At block 1005, the server analyzes access data for gaming applications from multiple client devices. The server can analyze access data in usage profiles for each client device individually. Additionally or alternatively, the server can analyze access in usage profiles collectively across multiple client devices. While the multiple client devices may not all provide access data for the same gaming applications, access data for the same gaming application is analyzed across the available access data from the client devices that have the appropriate data.

Then at block 1010, the server determines the likelihood that a specific client device will access specific gaming data files for each gaming application. The likelihood of accessing specific gaming data files may depend on one or more of the following: the level of expertise of the user of the gaming application as determined by, for example, the length of time the user spends on each of the levels of the gaming application or similar gaming applications or gaming applications manufactured by the same manufacturer; other applications running concurrently on the client device; and the time of day that the gaming application is accessed; previous history with the gaming application.

At block 1015, the server generates custom prefetching profiles for each of the multiple client devices and sends the custom prefetching profiles to the appropriate multiple client devices.

Figure 11:
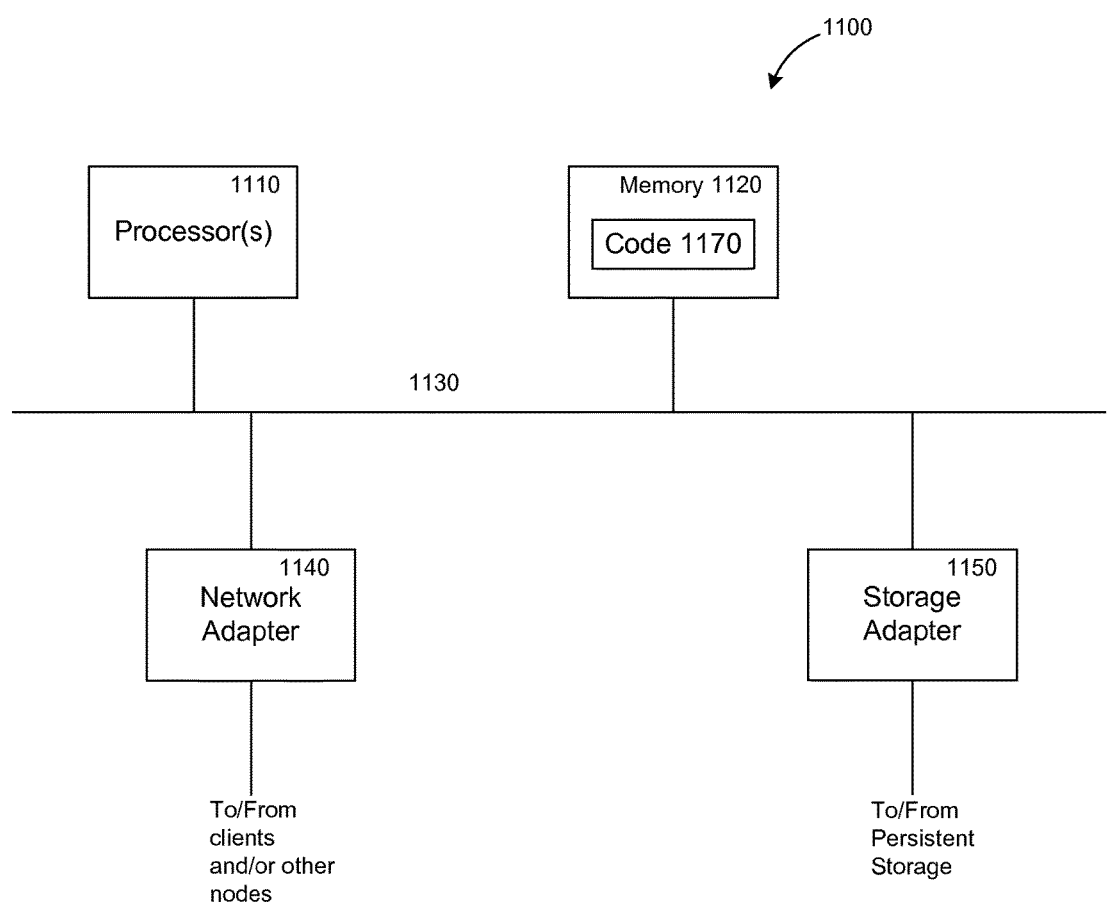
FIG. 11 contains a high-level block diagram showing an example architecture of a computer server, which may represent any computer described herein.

FIG. 11 contains a high-level block diagram showing an example architecture of a computer, which may represent any electronic device, any server, or any node within a cloud service as described herein. The computer 1100 includes one or more processors 1110 and memory 1120 coupled to an interconnect 1130. The interconnect 1130 shown in FIG. 11 is an abstraction that represents any one or more separate physical buses, point to point connections, or both connected by appropriate bridges, adapters, or controllers. The interconnect 1130, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1110 is/are the central processing unit (CPU) of the computer 1100 and, thus, control the overall operation of the computer 1100. In certain embodiments, the processor(s) 1110 accomplish this by executing software or firmware stored in memory 1120. The processor(s) 1110 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or the like, or a combination of such devices.

The memory 1120 is or includes the main memory of the computer 1100. The memory 1120 represents any form of random access memory (RAM), read-only memory (ROM), flash memory, or the like, or a combination of such devices. In use, the memory 1120 may contain code 1170 containing instructions according to the techniques disclosed herein.

Also connected to the processor(s) 1110 through the interconnect 1130 are a network adapter 1140 and a storage adapter 1150. The network adapter 1140 provides the computer 1100 with the ability to communicate with remote devices, over a network and may be, for example, an Ethernet adapter or Fibre Channel adapter. The network adapter 1140 may also provide the computer 1100 with the ability to communicate with other computers. The storage adapter 1150 allows the computer 1100 to access a persistent storage, and may be, for example, a Fibre Channel adapter or SCSI adapter.

The code 1170 stored in memory 1120 may be implemented as software and/or firmware to program the processor(s) 1110 to carry out actions described above. In certain embodiments, such software or firmware may be initially provided to the computer 1100 by downloading it from a remote system through the computer 1100 (e.g., via network adapter 1140).

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the embodiments is not intended to be exhaustive or to limit the embodiments to the precise form disclosed above. While specific examples for the embodiments are described above for illustrative purposes, various equivalent modifications are possible within the scope of the embodiments, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the embodiments.

Any patents and applications and other references noted above, including any that may be listed in accompanying filing papers, are incorporated herein by reference. Aspects of the embodiments can be modified, if necessary, to employ the systems, functions, and concepts included in such references to provide further implementations of the embodiments.

These and other changes can be made to the embodiments in light of the above Detailed Description. While the above description describes certain examples of the embodiments, and describes the best mode contemplated, no matter how detailed the above appears in text, the embodiments can be practiced in many ways. Details of the system may vary considerably in its specific implementation, while still being encompassed by the embodiments disclosed herein. As noted above, particular terminology used when describing certain features or aspects of the embodiments should not be taken to imply that the terminology is being redefined herein to be restricted to any specific characteristics, features, or aspects of the embodiments with which that terminology is associated. In general, the terms used in the following claims should not be construed to limit the embodiments to the specific examples disclosed in the specification, unless the above Detailed Description section explicitly defines such terms. Accordingly, the actual scope of the embodiments encompass not only the disclosed examples, but also all equivalent ways of practicing or implementing the embodiments under the claims.

While certain aspects of the embodiments are presented below in certain claim forms, the applicant contemplates the various aspects of the embodiments in any number of claim forms. For example, while only one aspect of the embodiments are recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the embodiments.

What is claimed is:

1. A computer-implemented method comprising:
   tracking, by a processor of a first client device associated with a first user, a first access data for a gaming application that has been accessed on the first client device;
   sending the first access data to a server, wherein the server is configured to perform a collective analysis of the first access data sent by the first client device and a second access data for the gaming application, wherein the second access data is received by the server from one or more other client devices associated with one or more other users that are different from the first user, wherein the collective analysis includes determining for the first client device, based on the first access data and the second access data, a prefetching profile that specifies a plurality of likelihood values for a plurality of gaming data files associated with the gaming application that are likely to be accessed on the first client device within a specific timeframe;
   receiving the prefetching profile from the server;
   based on the prefetching profile, determining a set of the plurality of gaming data files that are indicated to be likely to be accessed on the first client device that are not available at the first client device; and
   prefetching and storing at the first client device the set of gaming data files prior to the set of gaming data files being requested to be accessed on the first client device.

2. The computer-implemented method of claim 1, wherein the first access data includes one or more levels of the gaming application that have been accessed on the first client device.

3. The computer-implemented method of claim 2, wherein the first access data includes an access time for which the one or more levels of the gaming application have been accessed on the first client device.

4. The computer-implemented method of claim 2, wherein the first access data includes a duration spent on each of the one or more levels of the gaming application that have been accessed on the first client device.

5. The computer-implemented method of claim 1, wherein the first access data includes other applications running concurrently on the first client device with the gaming application.

6. The computer-implemented method of claim 1, wherein the collective analysis includes assigning a greater weight to the first access data than to the second access data when determining the likelihood values for the first client device.

7. The computer-implemented method of claim 1, further comprising:
receiving a request for a gaming data file of the plurality of gaming data files;
serving the gaming data file from a first storage in response to the request when it is determined that the gaming data file is in the first storage;
determining whether the gaming data file is in a second storage when it is determined that the gaming data file is not in the first storage; and
moving the gaming data file from the second storage to the first storage when it is determined that the gaming data file is in the second storage.

8. The computer-implemented method of claim 7, further comprising:
retrieving the gaming data file from an external source when it is determined that the gaming data file is not in the second storage; and
storing the retrieved gaming data file in the first storage.

9. A computer-implemented method comprising:
receiving, by a processor of a server, access data for one or more gaming applications provided by a plurality of client devices associated with a plurality of different users, respectively;
based on the access data, using one or more algorithms to collectively analyze the access data from the plurality of client devices to determine, for each client device of the plurality of client devices, a plurality of likelihood values for a plurality of gaming data files associated with the one or more gaming applications that are likely to be accessed on the client device within a specific timeframe; and
generating a respective prefetching profile for each client device of the plurality of client devices, wherein the respective prefetching profile specifies the plurality of likelihood values for the plurality of gaming data files that are likely to be accessed on a corresponding client device of the plurality of client devices.

10. The computer-implemented method of claim 9, wherein determining, for a respective client device of the plurality of client devices, the plurality of likelihood values for the plurality of gaming data files that are likely to be accessed within a specific timeframe is based on attributing greater weight to the access data received from the respective client device than the access data received from others of the client devices.

11. The computer-implemented method of claim 9, wherein the determined plurality of likelihood values for the plurality of gaming data files that are likely to be accessed is based on one or more levels of the one or more gaming applications that have been accessed by individual ones of the client devices.

12. The computer-implemented method of claim 11, wherein the determined plurality of likelihood values for the plurality of gaming data files that are likely to be accessed is based on an access time for which the one or more levels of the one or more gaming applications have been accessed by individual ones of the client devices.

13. The computer-implemented method of claim 11, wherein the determined plurality of likelihood values for the plurality of gaming data files that are likely to be accessed is based on a duration spent on each of the one or more levels of the one or more gaming applications that have been accessed by individual ones of the client devices.

14. The computer-implemented method of claim 9, further comprising sending the respective prefetching profile to the corresponding client device.

15. A client device comprising:
a processor configured to track a first access data for one or more gaming applications accessed by the client device, wherein the client device is associated with a first user;
a sending module configured to send the first access data for the one or more gaming applications to a server;
a receiving module configured to receive a prefetching profile from the server, wherein the prefetching profile identifies, based on a collective analysis of the first access data for the one or more gaming applications from the client device and a second access data for the one or more gaming applications executed on one or more other client devices associated with one or more other users, respectively, a plurality of likelihood values for a plurality of gaming data files that are likely to be accessed by the client device within a specific timeframe; and
a data manager configured to prefetch a set of gaming data files from an external source based on the prefetching profile, wherein the set of gaming data files to be prefetched are not available at the client device.

16. The client device of claim 15, further comprising:
a primary memory configured to store gaming data files; and
a handler module configured to accept requests for specific gaming data files, and to serve the specific gaming data files from the primary memory.

17. The client device of claim 16, further comprising:
a secondary memory configured to store prefetched gaming data files, wherein the handler module is further configured to move specific prefetched gaming data files to the primary memory prior to serving.

18. The client device of claim 16, wherein the primary memory is further configured to store the first and second access data and the prefetching profile.

19. The client device of claim 15, wherein the set of gaming data files are prefetched in order of likelihood of being accessed.

* * * * *